US011144099B1

(12) United States Patent
Silber et al.

(10) Patent No.: US 11,144,099 B1
(45) Date of Patent: Oct. 12, 2021

(54) SYSTEMS AND METHODS FOR PROVIDING CONTENT

(71) Applicant: Facebook, Inc., Menlo Park, CA (US)

(72) Inventors: Ian McIntyre Silber, San Francisco, CA (US); Thomas Frederick Dimson, San Francisco, CA (US); Ryan Keenan Olson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 3 days.

(21) Appl. No.: 16/235,437

(22) Filed: Dec. 28, 2018

(51) Int. Cl.
*G06F 1/16* (2006.01)
*G06T 3/40* (2006.01)

(52) U.S. Cl.
CPC .............. *G06F 1/1694* (2013.01); *G06T 3/40* (2013.01); *G06F 2200/1614* (2013.01); *G06F 2200/1637* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,262,769 B1 * | 7/2001 | Anderson | .......... | H04N 1/00437 348/231.99 |
| 7,313,418 B2 * | 12/2007 | Koyama | ........... | H04M 1/72439 455/566 |
| 7,978,176 B2 * | 7/2011 | Forstall | ................. | G06F 1/1626 345/158 |
| 8,610,830 B2 * | 12/2013 | Corlett | ................... | H04N 19/85 348/583 |
| 8,854,397 B2 * | 10/2014 | Xie | ........................... | G06F 3/14 345/660 |
| 10,304,163 B2 * | 5/2019 | Karunamuni | ......... | G06F 1/1694 |
| 10,564,425 B2 * | 2/2020 | Bamberger | ........... | G06F 1/1694 |
| 2006/0181550 A1 * | 8/2006 | Nohara | ................. | G06T 3/0006 345/648 |
| 2007/0047943 A1 * | 3/2007 | Seo | ........................ | G03B 17/02 396/141 |
| 2008/0076481 A1 * | 3/2008 | Iwasaki | ..................... | G06T 3/60 455/566 |
| 2008/0266326 A1 * | 10/2008 | Porwal | .................. | G06F 1/1613 345/659 |
| 2009/0237379 A1 * | 9/2009 | Lawrenz | ............... | G06F 1/1607 345/204 |
| 2010/0007603 A1 * | 1/2010 | Kirkup | .................. | G06F 1/1616 345/158 |
| 2013/0151987 A1 | 6/2013 | Flynn, III et al. | | |
| 2013/0198788 A1 | 8/2013 | Barger et al. | | |
| 2014/0071308 A1 * | 3/2014 | Cieplinski | ................. | G06T 3/60 348/222.1 |

(Continued)

FOREIGN PATENT DOCUMENTS

WO  WO-2018026152 A1 *  2/2018  ......... H04N 21/4728

*Primary Examiner* — Motilewa Good Johnson
(74) *Attorney, Agent, or Firm* — Sheppard Mullin Richter & Hampton LLP

(57) ABSTRACT

Systems, methods, and non-transitory computer-readable media can present landscape content through a display screen of the computing device, the landscape content being presented in a landscape viewing mode. A rotation of the display screen to transition to a portrait viewing mode can be determined. The landscape content can be scaled based on the rotation of the display screen, wherein the scaled landscape content is presented through the display screen.

19 Claims, 13 Drawing Sheets

(56) References Cited

U.S. PATENT DOCUMENTS

| | | | |
|---|---|---|---|
| 2015/0091945 A1* | 4/2015 | Uratani | G06T 3/60 345/649 |
| 2015/0109408 A1* | 4/2015 | Sharma | H04N 5/23296 348/39 |
| 2015/0249793 A1* | 9/2015 | Nichols | C07D 409/12 348/239 |
| 2015/0339804 A1* | 11/2015 | Kim | G06F 3/04886 345/659 |
| 2016/0100111 A1* | 4/2016 | Atkinson | H04N 21/4223 348/14.01 |
| 2016/0156635 A1 | 6/2016 | Liu et al. | |
| 2016/0219217 A1* | 7/2016 | Williams | H04N 5/23293 |
| 2016/0330258 A1* | 11/2016 | Sandhu | H04L 65/4076 |
| 2016/0334973 A1 | 11/2016 | Reckhow et al. | |
| 2017/0062012 A1 | 3/2017 | Bloch et al. | |
| 2018/0103289 A1* | 4/2018 | Li | H04N 21/2187 |

* cited by examiner

500

```
┌─────────────────────────────────────────────────────────────┐
│   Present landscape content through a display screen of the │
│  computing device, the landscape content being presented in │
│                   a landscape viewing mode                  │
│                             502                             │
└─────────────────────────────────────────────────────────────┘
                              │
                              ▼
┌─────────────────────────────────────────────────────────────┐
│ Determine a rotation of the display screen to transition to │
│                   a portrait viewing mode                   │
│                             504                             │
└─────────────────────────────────────────────────────────────┘
                              │
                              ▼
┌─────────────────────────────────────────────────────────────┐
│  Scale the landscape content based on the rotation of the   │
│   display screen, wherein the scaled landscape content is   │
│             presented through the display screen            │
│                             506                             │
└─────────────────────────────────────────────────────────────┘
```

FIGURE 5A

SYSTEMS AND METHODS FOR PROVIDING CONTENT

FIELD OF THE INVENTION

The present technology relates to the field of content provisioning. More particularly, the present technology relates to techniques for presenting video content on display screens.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

SUMMARY

Various embodiments of the present disclosure can include systems, methods, and non-transitory computer readable media configured to present landscape content through a display screen of the computing device, the landscape content being presented in a landscape viewing mode. A rotation of the display screen to transition to a portrait viewing mode can be determined. The landscape content can be scaled based on the rotation of the display screen, wherein the scaled landscape content is presented through the display screen.

In an embodiment, a size of the landscape content, as presented in the landscape viewing mode, is modified based on the rotation of the display screen.

In an embodiment, the size of the landscape content increases as the display screen transitions from the landscape viewing mode to the portrait viewing mode.

In an embodiment, the scaled landscape content is presented full screen during the rotation of the display screen.

In an embodiment, the landscape content is at least one of: an image, a video, and a live content stream.

In an embodiment, the systems, methods, and non-transitory computer readable media are configured to present the landscape content through the display screen in the portrait viewing mode; determine a rotation of the display screen to transition to the landscape viewing mode; and scale the landscape content based on the rotation of the display screen, wherein the scaled landscape content is presented through the display screen.

In an embodiment, a size of the landscape content, as presented in the portrait viewing mode, is modified based on the rotation of the display screen.

In an embodiment, the size of the landscape content decreases as the display screen transitions from the portrait viewing mode to the landscape viewing mode.

In an embodiment, the scaled landscape content is presented full screen while the display screen is in the portrait viewing mode.

In an embodiment, scaling the landscape content based on the rotation of the display screen further comprises scaling one or more frames of the landscape content.

Various embodiments of the present disclosure can include systems, methods, and non-transitory computer readable media configured to determine a video being accessed from a content provider. A first viewing mode of a display screen of the computing device can be determined. A first content stream associated with the video can be accessed based at least in part on the first viewing mode of the display screen, wherein the first content stream is encoded for presentation of the video in the first viewing mode of the display screen.

In an embodiment, the first viewing mode corresponds to a landscape viewing mode.

In an embodiment, the first content stream is encoded for presentation of the video in the landscape viewing mode.

In an embodiment, the video is associated with the first content stream for presentation of the video in a landscape viewing mode and a second content stream for presentation of the video in a portrait viewing mode.

In an embodiment, the systems, methods, and non-transitory computer readable media are configured to determine a second viewing mode of the display screen of the computing device and access a second content stream associated with the video based at least in part on the second viewing mode of the display screen.

In an embodiment, the second viewing mode corresponds to a portrait viewing mode.

In an embodiment, the second content stream is encoded for presentation of the video in the portrait viewing mode.

In an embodiment, the systems, methods, and non-transitory computer readable media are configured to determine the display screen of the computing device is again in the first viewing mode and access the first content stream associated with the video based at least in part on the first viewing mode of the display screen.

In an embodiment, the video is accessed from a content channel, and wherein the content channel is associated with a chat room.

In an embodiment, the chat room is accessible through a social networking system to communicate with other users in real-time.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5A illustrates an example method, according to an embodiment of the present disclosure.

Figure 1:
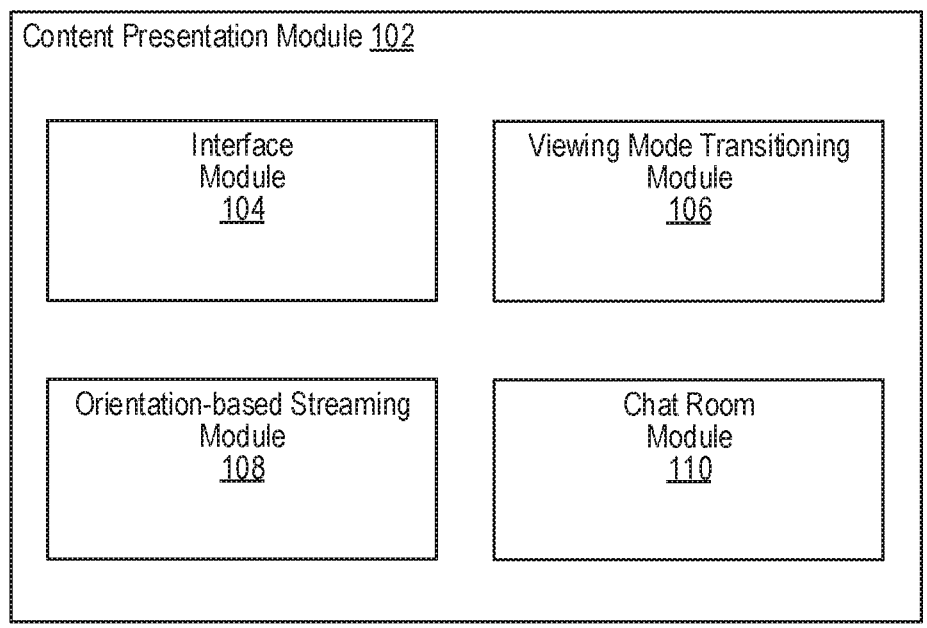
FIG. 1 illustrates an example system including an example content presentation module, according to an embodiment of the present disclosure.
Figure 1:
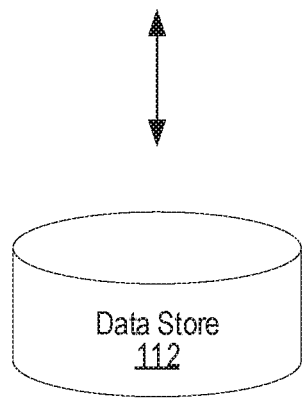

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

People use computing devices (or systems) for a wide variety of purposes. As mentioned, under conventional approaches, a user can utilize a computing device to share content items (e.g., documents, images, videos, audio, etc.) with other users. Such content items can be made available through a social networking system. Users can operate their computing devices to access the content items through the platform. Typically, the content items can be provided, or uploaded, by various entities including, for example, content publishers and also users of the social networking system.

Under conventional approaches, users can create content in a horizontal orientation (e.g., landscape content) or a vertical orientation (e.g., vertical content). In general, landscape content typically has an aspect ratio that is best viewed on widescreen display screens having similar aspect ratios (e.g., 16:9, 18:9, 21:9, etc.). In contrast, vertical content typically has an aspect ratio that is best viewed on vertical display screens having similar aspect ratios (e.g., 9:16, 9:18, 9:21, etc.). Users may access landscape content using computing devices with vertical display screens (e.g., mobile devices). In these instances, presentation of landscape content can vary depending on a display orientation of a vertical display screen through which the landscape content is being viewed. For example, landscape content can be presented based on its intended aspect ratio (e.g., 16:9, 18:9, 21:9, etc.) when the vertical display screen is oriented horizontally in a landscape viewing mode. However, when the vertical display screen is rotated to a vertical orientation, the landscape content typically cannot be presented in full screen due to its content being formatted for widescreen display. In such instances, the landscape content is typically presented with borders that are needed to fill a top portion and a bottom portion of the vertical display screen.

Further, under conventional approaches, landscape content being presented through a vertical display screen can be shown in landscape viewing mode when the vertical display screen is positioned horizontally or a portrait viewing mode when the vertical display screen is positioned vertically. The viewing mode in which the landscape content is presented typically changes when the vertical display screen is rotated from a horizontal orientation to a vertical orientation and from a vertical orientation to a horizontal orientation. Under conventional approaches, switching between display orientations is often performed in a disruptive manner. For instance, switching from a landscape viewing mode to a portrait viewing mode often requires using borders to fill portions of the vertical display screen. Such limitations typically associated with landscape content can discourage users from accessing and sharing content, especially when those users prefer to view content using computing devices that are designed to display content vertically.

An improved approach rooted in computer technology overcomes the foregoing and other disadvantages associated with conventional approaches specifically arising in the realm of computer technology. In an embodiment, a vertical display screen can dynamically transition between display orientations in a smooth and immersive manner. For example, a vertical display screen presenting landscape content can be rotated to transition from a landscape viewing mode to a portrait viewing mode. In this example, the landscape content can be scaled dynamically to fill the vertical display screen as the vertical display screen is rotated. In another embodiment, landscape content can be associated with one content stream for providing content that is formatted (or encoded) for presentation in a portrait viewing mode and another content stream for providing the same content but formatted (or encoded) for presentation in a landscape viewing mode. A computing device with a vertical display screen can alternate between the two content streams based on rotation of the vertical display screen. As a result, landscape content can always be presented full screen through vertical display screens. More details relating to the disclosed technology are provided below.

FIG. 1 illustrates an example system 100 including an example content presentation module 102, according to an embodiment of the present disclosure. As shown in the example of FIG. 1, the content presentation module 102 can include an interface module 104, a viewing mode transitioning module 106, an orientation-based streaming module 108, and a chat room module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content presentation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content presentation module 102 or at least a portion thereof can be implemented using one or more computing devices or systems that include one or more servers, such as network servers or cloud servers. In some instances, the content presentation module 102 can, in part or in whole, be implemented within or configured to operate in conjunction with a social networking system (or service), such as the social networking system 630 of FIG. 6. In some instances, the content presentation module 102 can be, in part or in whole, implemented within or configured to operate in conjunction or be integrated with a client computing device, such as the user device 610 of FIG. 6. For example, the content presentation module 102 can be implemented as or within a dedicated application (e.g., app), a program, or an applet running on a user computing device or client computing system. The application incorporating or implementing instructions for performing some, or all, functionality of the content presentation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content presentation module 102 can be configured to communicate and/or operate with the at least one data store 112, as shown in the example system 100. The at least one data store 112 can be configured to store and maintain various types of data. For example, the data store 112 can store information describing various content that has been shared by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

In various embodiments, the interface module 104 can be configured to provide an interface (e.g., graphical user interface) through which media content items (e.g., images, videos, live content streams, etc.) can be presented. Such media content items may be formatted for presentation in a landscape viewing mode (e.g., landscape content) or a portrait viewing mode (e.g., vertical content). For example, a media content item may be accessed using a computing device (e.g., the user device 610 of FIG. 6) and from a social networking system (e.g., the social networking system 630 of FIG. 6). The computing device may include a vertical display screen having an aspect ratio suited for presenting content vertically (e.g., 9:16, 9:18, 9:21, etc.).

The viewing mode transitioning module 106 can be configured to modify presentation of landscape content through a vertical display screen to dynamically (or smoothly) transition between viewing modes. More details regarding the viewing mode transitioning module 106 will be provided below with reference to FIG. 2A.

The orientation-based streaming module 108 can be configured to access different content streams of a media content item depending on a viewing mode of a display screen. More details regarding the orientation-based streaming module 108 will be provided below with reference to FIG. 2B.

The chat room module 110 can provide chat rooms in which users of a social networking system (e.g., the social networking system 630 of FIG. 6) can electronically chat and interact. For example, a user of the social networking system may be a content creator that publishes content (e.g., images, videos, looping videos, live content streams, etc.) through one or more content feeds (e.g., ephemeral content feeds, non-ephemeral content feeds). In another example, the content creator may share content through a profile page that is published through the social networking system. In yet another example, the content creator may also publish video content through one or more content channels. A content channel may be accessed through the social networking system to view video content posted by the content creator. In an embodiment, a content channel can be used to distribute only content created by the content creator. In another embodiment, a content channel may be a topic channel that corresponds to some topic. For example, a topic channel may be dedicated to content that relates to a person such as a celebrity. In various embodiments, respective chat rooms can be associated with content feeds, profile pages, and content channels. Users can visit such content feeds, profile pages, and content channels to access corresponding chat rooms. In an embodiment, users can access a chat room to communicate in real-time with other users having similar interests. Content accessible through content feeds, profile pages, and content channels can be presented to users in accordance with the functionality of the content presentation module 102.

Figure 2A:
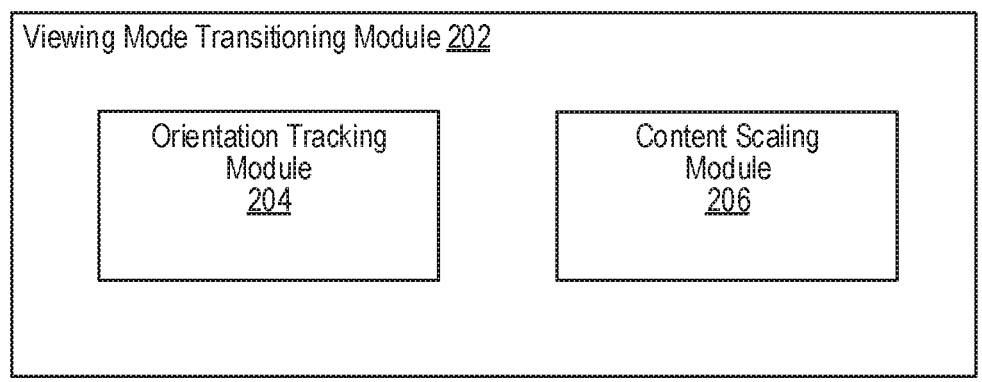
FIG. 2A illustrates an example viewing mode transitioning module, according to an embodiment of the present disclosure.

FIG. 2A illustrates an example viewing mode transitioning module 202, according to an embodiment of the present disclosure. The viewing mode transitioning module 202 can be configured to dynamically modify presentation of landscape content through a vertical display screen to smoothly transition between viewing modes. In an embodiment, the viewing mode transitioning module 202 can dynamically transition between viewing modes based on a rotation of a vertical display screen. For example, a vertical display screen can present landscape content based on its intended aspect ratio (e.g., 16:9, 18:9, 21:9, etc.) when the vertical display screen is positioned in a horizontal orientation. In an embodiment, as the vertical display screen is rotated to a vertical orientation, the viewing mode transitioning module 202 can dynamically transition presentation of the landscape content from a landscape viewing mode to a portrait viewing mode. In an embodiment, the viewing mode transitioning module 202 can scale the landscape content when transitioning between viewing modes. For example, the viewing mode transitioning module 202 can increase a scale of the landscape content when transitioning to the portrait viewing mode to ensure the landscape content is presented full screen through the vertical display screen. In other words, unlike conventional approaches, the landscape content can be presented in either viewing mode without borders. In some embodiments, the viewing mode transitioning module 106 of FIG. 1 can be implemented with the viewing mode transitioning module 202. As shown in the example of FIG. 2A, the viewing mode transitioning module 202 can include an orientation tracking module 204 and a content scaling module 206.

The orientation tracking module 204 can be configured to determine a display orientation of a vertical display screen of a computing device. For example, the orientation tracking module 204 can determine changes to a rotation of the vertical display screen based on positional or orientation data determined by one or more sensors in the computing device (e.g., accelerometer(s), gyroscope(s), inertial measurement units (IMUs), etc.). The orientation tracking module 204 can thus determine when a vertical display screen is positioned in a vertical orientation (e.g., a portrait viewing mode) and a horizontal orientation (e.g., a landscape viewing mode). The orientation tracking module 204 can also track changes to a rotation of the vertical display screen as the vertical display screen is rotated from one orientation to another orientation. That is, the orientation tracking module 204 can track changes to a rotation of the vertical display screen as the vertical display screen is rotated from a horizontal orientation to a vertical orientation and from a vertical orientation to a horizontal orientation.

The content scaling module 206 can be configured to dynamically modify presentation of landscape content based on changes to an orientation a vertical display screen. In an embodiment, landscape content being presented in a landscape viewing mode can be increased in scale (or scaled up) as a vertical display screen through which the landscape content is being presented is rotated toward a vertical orientation. For example, the content scaling module 206 can dynamically increase the size (or resolution) of some or all image frames of the landscape content as the vertical display screen is rotated toward a vertical orientation. In an embodiment, the content scaling module 206 can dynamically increase the size of the landscape content to ensure the landscape content is presented full screen through the vertical display screen regardless of its orientation. The content scaling module 206 can cease scaling the landscape content once the vertical display screen is positioned in a vertical orientation. In an embodiment, the landscape content can be presented full screen in a portrait viewing mode when the vertical display screen is positioned in a vertical orientation. In an embodiment, the size (or resolution) of the landscape content dynamically be decreased in scale (or scaled down) as the vertical display screen is rotated toward a horizontal orientation. For example, the content scaling module 206 can dynamically decrease the size (or resolution) of some or all frames of the landscape content as the vertical display screen is rotated toward a horizontal orientation. In various embodiments, the content scaling module 206 can apply generally known content scaling techniques to resize landscape content.

Figure 2B:
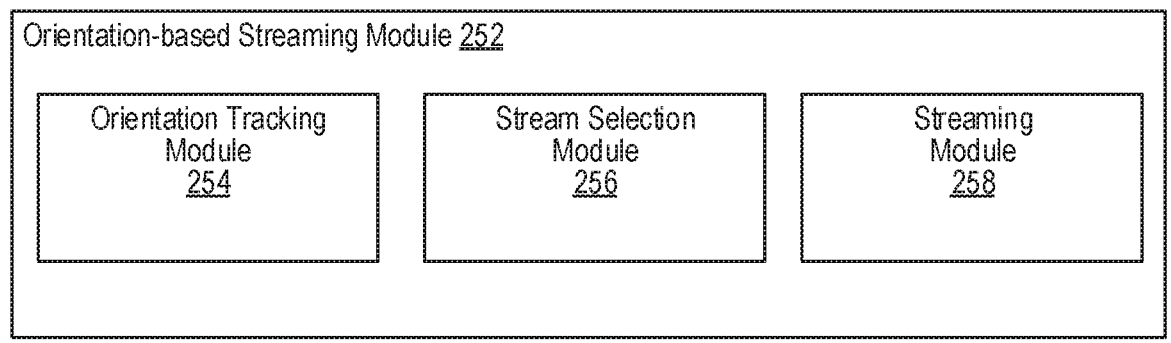
FIG. 2B illustrates an example orientation-based streaming module, according to an embodiment of the present disclosure.

FIG. 2B illustrates an example orientation-based streaming module 252, according to an embodiment of the present disclosure. The orientation-based streaming module 252 can be configured to stream videos based on display orientation. For example, in an embodiment, a video can be encoded as a first content stream for presenting the video in a portrait viewing mode and as a second content stream for presenting the same video in a landscape viewing mode. In an embodiment, a computing device accessing the video can alternate between the first content stream and the second content stream based on changes to an orientation of a display screen associated with the computing device. In some embodiments, the orientation-based streaming module 108 of FIG. 1 can be implemented with the orientation-based streaming module 252. As shown in the example of FIG. 2B, the orientation-based streaming module 252 can include an orientation tracking module 254, a stream selection module 256, and a streaming module 258.

The orientation tracking module 254 can be configured to determine a display orientation of a display screen of a computing device. For example, the orientation tracking module 254 can determine changes to a rotation of the display screen based on positional or orientation data determined by one or more sensors in the computing device (e.g., accelerometer(s), gyroscope(s), inertial measurement units (IMUs), etc.). The orientation tracking module 254 can thus determine when a display screen is positioned in a vertical orientation (e.g., a portrait viewing mode) or a horizontal orientation (e.g., a landscape viewing mode). The orientation tracking module 254 can also track changes to a rotation of the display screen as the display screen is rotated from one orientation to another orientation. That is, the orientation tracking module 254 can track changes to a rotation of the display screen as the display screen is rotated from a horizontal orientation to a vertical orientation and from a vertical orientation to a horizontal orientation.

The stream selection module 256 can be configured to select (or request from a content server) a content stream associated with a video based on an orientation of a display screen of a computing device. For example, in some embodiments, videos can be associated with orientation-specific content streams. That is, a first content stream of a video can be encoded for presentation in a landscape viewing mode (e.g., 16:9, 18:9, etc.) while a second content stream of the video can be encoded for presentation in a portrait viewing mode (e.g., 9:16, 9:18, etc.). In some embodiments, in response to a determination that a display screen is positioned in a certain orientation or within a range of orientations, a portion or all of a content stream of a video can be suitably encoded for presentation in the corresponding viewing mode. In an embodiment, the stream selection module 256 can select or request either the first content stream or the second content stream when presenting the video through a display screen of a computing device. For example, the stream selection module 256 can determine when the display screen is positioned in a horizontal orientation based on the orientation tracking module 254. In this example, the stream selection module 256 can select or request the first content stream of the video that is encoded for presentation in a landscape viewing mode. In another example, the stream selection module 256 can determine when the display screen is positioned in a vertical orientation based on the orientation tracking module 254. In this example, the stream selection module 256 can select or request the second content stream of the video that is encoded for presentation in a portrait viewing mode. In various embodiments, when the video is presented, the stream selection module 256 can alternate between the first content stream and the second content stream based on a viewing mode of the display screen.

The streaming module 258 can be configured to send, or transmit, data corresponding to portions of an accessed content stream. The streaming module 258 can utilize generally known approaches and protocols for streaming content including, for example, the HyperText Transfer Protocol (HTTP) or the Real-time Streaming Protocol (RTSP), to name some examples. The streaming content can be received by a computing device associated with a user and presented through a display screen of the computing device.

Figure 3A:
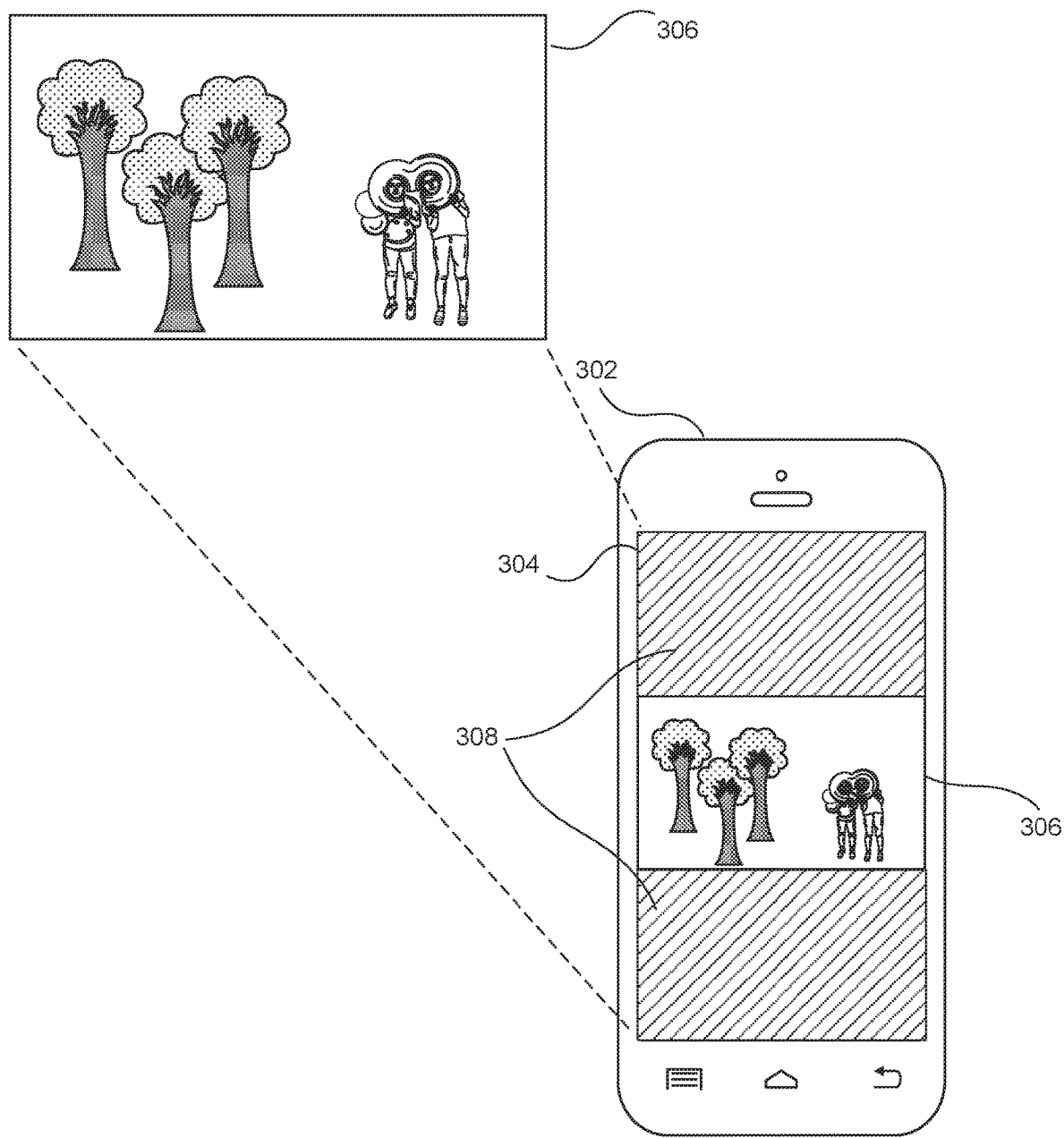
FIG. 3A illustrates an example diagram demonstrating presentation of landscape content under conventional approaches.

FIG. 3A illustrates an example of landscape content 306 being presented through a display screen 304 of a computing device 302 in accordance with conventional techniques. As shown, the display screen 304 is designed for displaying content in a vertical orientation. Thus, when the landscape content 306 is presented through the display screen 304, the landscape content 306 is shown with borders 308 which are needed to fill a top portion and a bottom portion of the display screen 304.

Figure 3B:
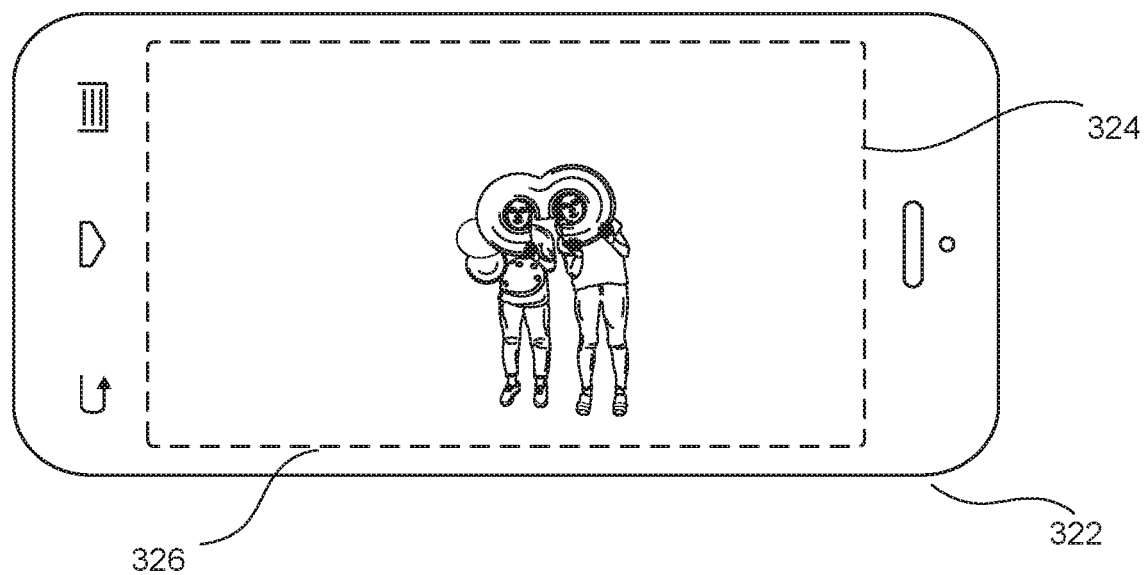
FIGS. 3B-3D illustrate example diagrams, according to an embodiment of the present disclosure.
Figure 3C:
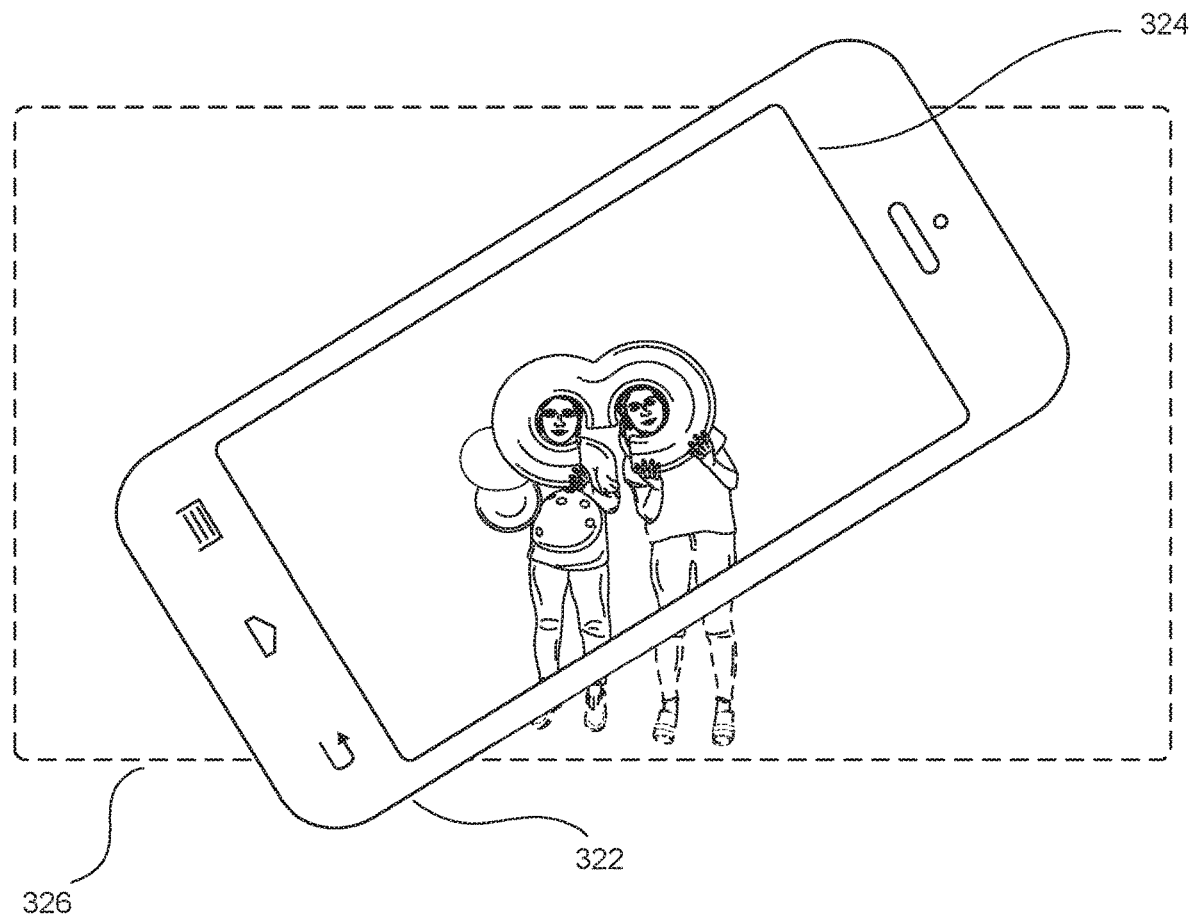
Figure 3D:
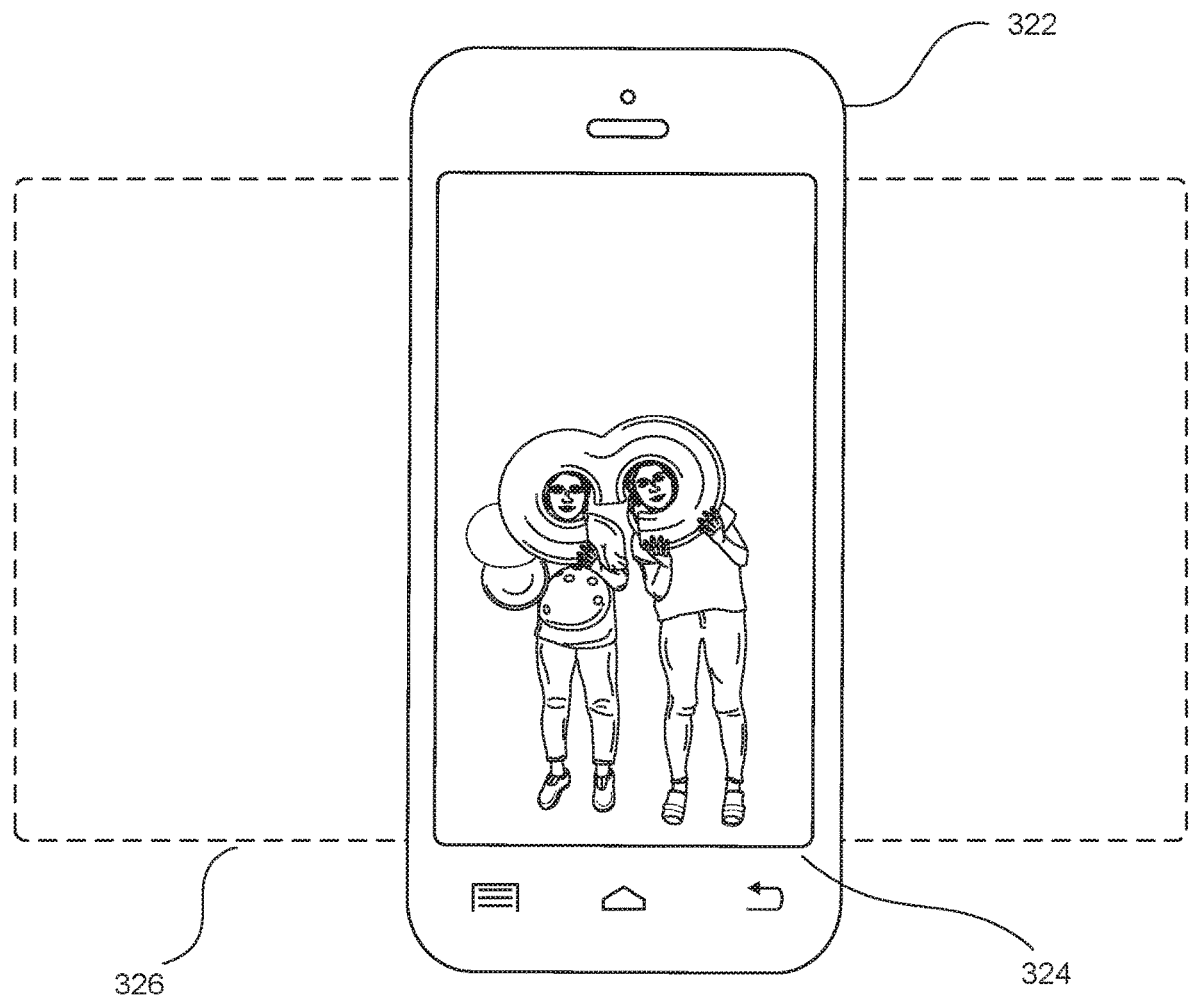

FIGS. 3B-3D illustrate dynamically modifying presentation of landscape content relative to changes to an orientation a vertical display screen based on the content presentation module 102, according to embodiments of the present disclosure. For example, FIG. 3B illustrates presentation of landscape content 326 through a vertical display screen 324 of a computing device 322. In an embodiment, the landscape content 326 can be dynamically be resized based on rotation of the vertical display screen 324. For example, in FIG. 3C, the landscape content 326 has been increased in scale to allow for full screen presentation as the vertical display screen 324 of the computing device 322 is rotated. In FIG. 3D, a scale of the landscape content 326 has been increased further to accommodate full screen presentation of the landscape content 326 while the vertical display screen 324 of the computing device 322 is positioned in a vertical orientation.

Figure 4A:
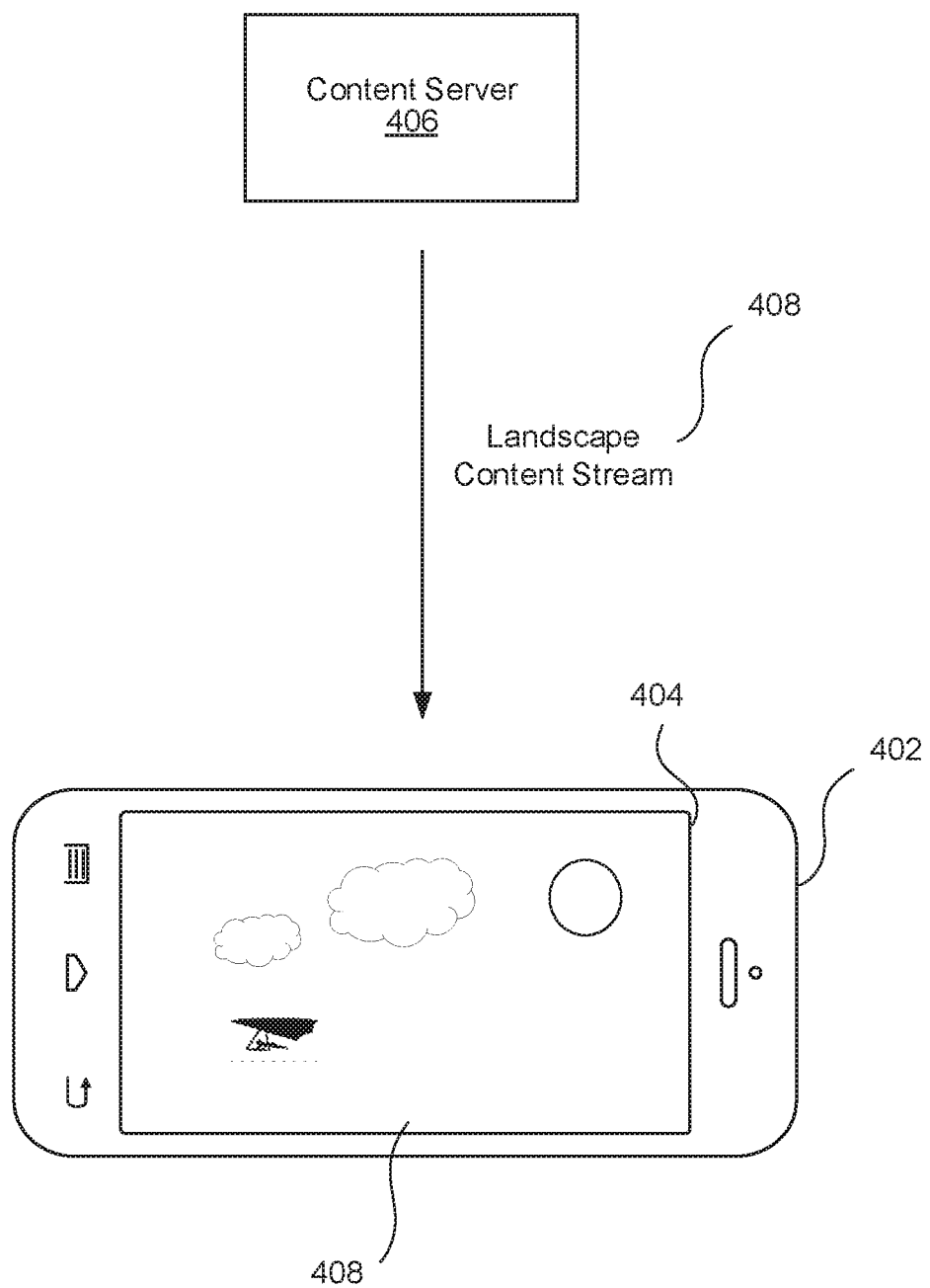
FIGS. 4A-4B also illustrate example diagrams, according to an embodiment of the present disclosure.
Figure 4B:
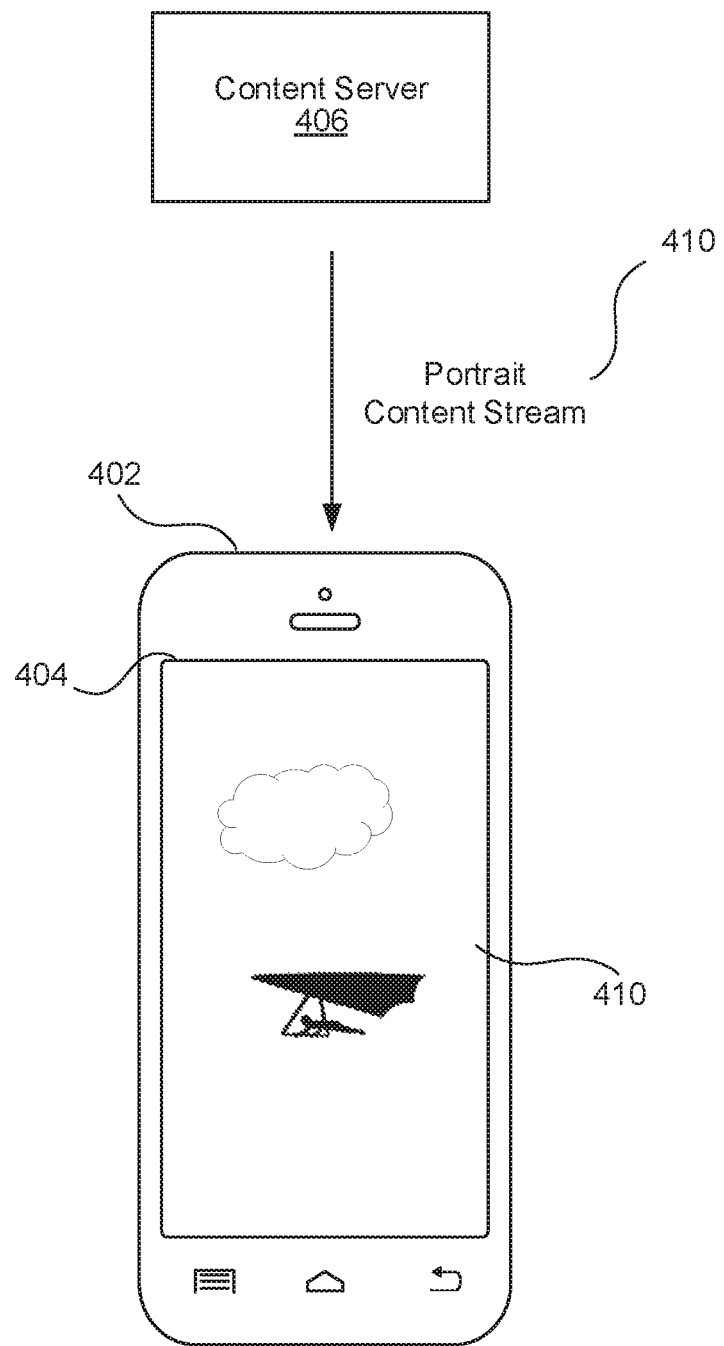

FIGS. 4A-4B illustrate accessing orientation-specific content streams based on the content presentation module 102, according to embodiments of the present disclosure. For example, FIG. 4A illustrates a computing device 402 accessing content from a content server 406. In FIG. 4A, a display screen 404 of the computing device 402 is positioned in a horizontal orientation. In this example, changes to a rotation of the display screen 404 can be determined based on positional or orientation data determined by one or more sensors in the computing device 402. Accordingly, it can be determined when the display screen 404 is positioned in a vertical orientation (e.g., a portrait viewing mode) or a horizontal orientation (e.g., a landscape viewing mode). The computing device 402 can request a content stream 408 for presenting the content in a landscape viewing mode based upon the display screen 404 being positioned in the horizontal orientation. In contrast, FIG. 4B illustrates the display screen 404 of the computing device 402 in a vertical orientation. In this example, the computing device 402 can request a content stream 410 for presenting the content in a portrait viewing mode based upon the display screen 404 being positioned in the vertical orientation.

FIG. 5A illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, landscape content can be presented through a display screen of the computing device, the landscape content being presented in a landscape viewing mode. At block 504, a rotation of the display screen to transition to a portrait viewing mode can be determined. At block 506, the landscape content can be scaled based on the rotation of the display screen, wherein the scaled landscape content is presented through the display screen.

Figure 5B:
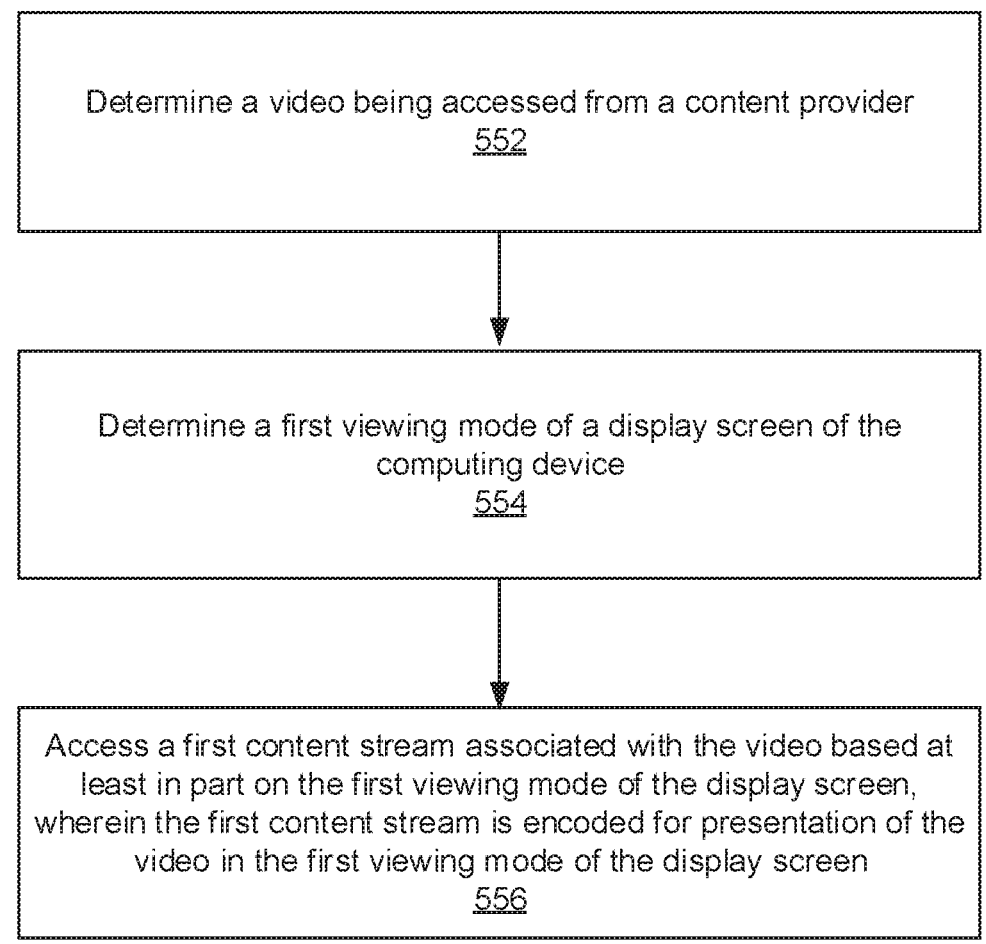
FIG. 5B illustrates another example method, according to an embodiment of the present disclosure.

FIG. 5B illustrates an example method 550, according to an embodiment of the present disclosure. It should be appreciated that there can be additional, fewer, or alternative steps performed in similar or alternative orders, or in parallel, within the scope of the various embodiments discussed herein unless otherwise stated.

At block 552, a video being accessed from a content provider can be determined. At block 554, a first viewing mode of a display screen of the computing device can be determined. At block 556, a first content stream associated with the video can be accessed based at least in part on the first viewing mode of the display screen, wherein the first content stream is encoded for presentation of the video in the first viewing mode of the display screen.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
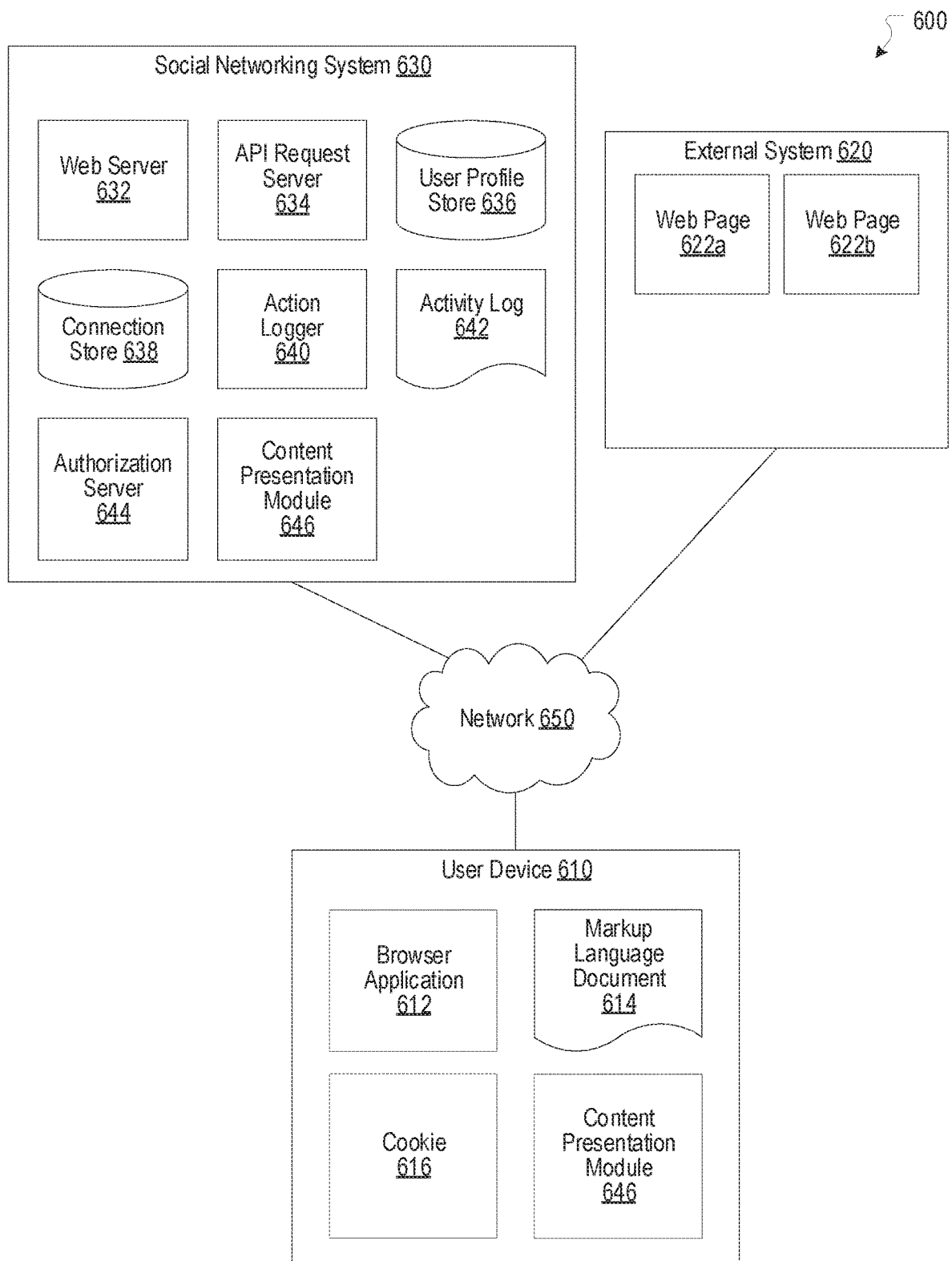
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content presentation module 646. The content presentation module 646 can, for example, be implemented as the content presentation module 102 of FIG. 1. In some embodiments, the content presentation module 646, in whole or in part, is additionally or alternatively implemented in the user device 610. As discussed previously, it should be appreciated that there can be many variations or other possibilities.

Hardware Implementation

Figure 7:
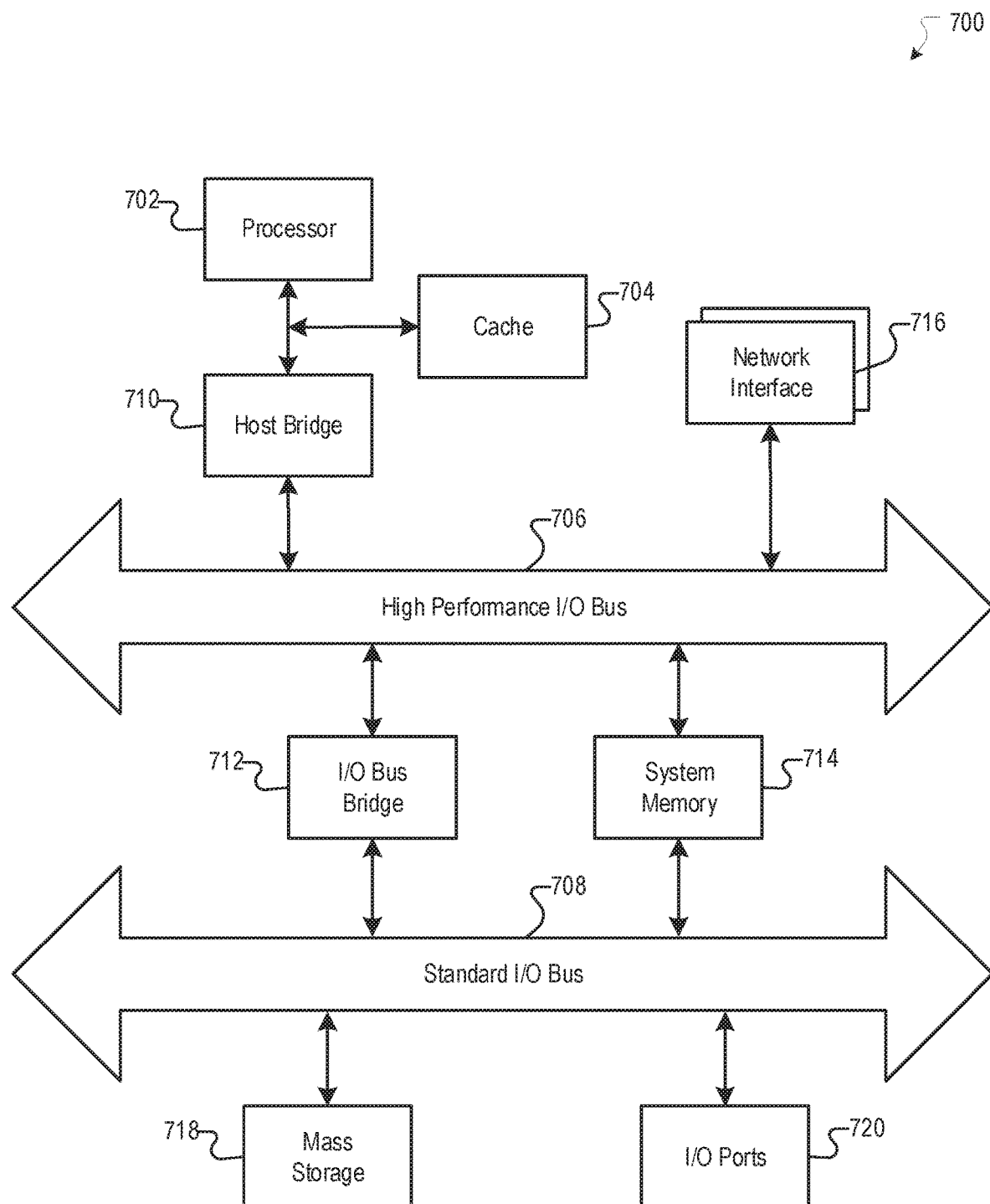
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing, by a computing device, a live content stream for presentation through a display screen of the computing device, wherein the live content stream is presented in a landscape viewing mode;
    determining, by the computing device, whether to dynamically transition presentation of the live content stream between the landscape viewing mode and a portrait viewing mode based on a view mode transition technique or an orientation-based streaming technique;
    in response to a determination to dynamically transition the presentation of the live content stream based on the view mode transition technique, scaling, by the computing device, the live content stream relative to the rotation of the display screen as the display screen is rotated to transition to the portrait viewing mode, wherein the scaled live content stream is presented through the display screen, and wherein the scaling increases a resolution of one or more frames of the live content stream as the display screen transitions from the landscape viewing mode to the portrait viewing mode; and
    as the display screen is rotated to transition to the landscape viewing mode, scaling, by the computing device, the live content stream relative to the rotation of the display screen, wherein the scaled live content stream is presented through the display screen, and wherein the scaling decreases a resolution of one or more frames of the live content stream as the display screen transitions from the portrait viewing mode to the landscape viewing mode.

2. The computer-implemented method of claim 1, wherein a size of the live content stream increases as the display screen transitions from the landscape viewing mode to the portrait viewing mode.

3. The computer-implemented method of claim 1, wherein the scaled live content stream is presented full screen during the rotation of the display screen.

4. The computer-implemented method of claim 1 wherein the view mode transition technique dynamically scales presentation of the live content stream as the display screen transitions between the portrait viewing mode and the landscape viewing mode.

5. The computer-implemented method of claim 1, wherein the orientation-based streaming technique dynamically adjusts presentation of the live content stream based on orientation-specific content streams associated with the live content stream.

6. The computer-implemented method of claim 1, wherein the scaled live content stream is presented full screen while the display screen is in the portrait viewing mode.

7. The computer-implemented method of claim 1, wherein scaling the live content stream relative to the rotation of the display screen further comprises:
    scaling, by the computing device, one or more frames of the landscape content.

8. The computer-implemented method of claim 1, further comprising:
    accessing, by the computing device, the live content stream through a content channel used to exclusively distribute content associated with a content creator.

9. The computer-implemented method of claim 1, wherein the content channel is associated with a chat room that is accessible to communicate in real-time with other users.

10. A system comprising:
at least one processor; and
a memory storing instructions that, when executed by the at least one processor, cause the system to perform:
providing a live content stream for presentation through a display screen of the computing device, wherein the live content stream is presented in a landscape viewing mode;
determining whether to dynamically transition presentation of the live content stream between the landscape viewing mode and a portrait viewing mode based on a view mode transition technique or an orientation-based streaming technique;
in response to a determination to dynamically transition the presentation of the live content stream based on the view mode transition technique, scaling the live content stream relative to the rotation of the display screen as the display screen is rotated to transition to the portrait viewing mode, wherein the scaled live content stream is presented through the display screen, and wherein the scaling increases a resolution of one or more frames of the live content stream as the display screen transitions from the landscape viewing mode to the portrait viewing mode; and
as the display screen is rotated to transition to the landscape viewing mode, scaling the live content stream relative to the rotation of the display screen, wherein the scaled live content stream is presented through the display screen, and wherein the scaling decreases a resolution of one or more frames of the live content stream as the display screen transitions from the portrait viewing mode to the landscape viewing mode.

11. The system of claim 10, wherein a size of the live content stream increases as the display screen transitions from the landscape viewing mode to the portrait viewing mode.

12. The system of claim 10, wherein the scaled live content stream is presented full screen during the rotation of the display screen.

13. The system of claim 10, further comprising:
providing the live content stream through the display screen in the portrait viewing mode;
determining a rotation of the display screen to transition to the landscape viewing mode; and
scaling the live content stream based on the rotation of the display screen, wherein the scaled live content stream is provided for presentation through the display screen.

14. The system of claim 13, wherein a size of the live content stream, as presented in the portrait viewing mode, is modified based on the rotation of the display screen.

15. A non-transitory computer-readable storage medium including instructions that, when executed by at least one processor of a computing system, cause the computing system to perform a method comprising:
providing a live content stream for presentation through a display screen of the computing device, wherein the live content stream is presented in a landscape viewing mode;
determining whether to dynamically transition presentation of the live content stream between the landscape viewing mode and a portrait viewing mode based on a view mode transition technique or an orientation-based streaming technique;
in response to a determination to dynamically transition the presentation of the live content stream based on the view mode transition technique, scaling the live content stream relative to the rotation of the display screen as the display screen is rotated to transition to the portrait viewing mode, wherein the scaled live content stream is presented through the display screen, and wherein the scaling increases a resolution of one or more frames of the live content stream as the display screen transitions from the landscape viewing mode to the portrait viewing mode; and
as the display screen is rotated to transition to the landscape viewing mode, scaling the live content stream relative to the rotation of the display screen, wherein the scaled live content stream is presented through the display screen, and wherein the scaling decreases a resolution of one or more frames of the live content stream as the display screen transitions from the portrait viewing mode to the landscape viewing mode.

16. The non-transitory computer-readable storage medium of claim 15, wherein a size of the live content stream increases as the display screen transitions from the landscape viewing mode to the portrait viewing mode.

17. The non-transitory computer-readable storage medium of claim 15, wherein the scaled live content stream is presented full screen during the rotation of the display screen.

18. The non-transitory computer-readable storage medium of claim 15, further comprising:
providing the live content stream through the display screen in the portrait viewing mode;
determining a rotation of the display screen to transition to the landscape viewing mode; and
scaling the live content stream based on the rotation of the display screen, wherein the scaled live content stream is provided for presentation through the display screen.

19. The non-transitory computer-readable storage medium of claim 18, wherein a size of the live content stream, as presented in the portrait viewing mode, is modified based on the rotation of the display screen.

* * * * *